United States Patent
Francke et al.

(10) Patent No.: US 6,822,240 B2
(45) Date of Patent: Nov. 23, 2004

(54) DETECTION OF RADIATION AND POSITRON EMISSION TOMOGRAPHY

(75) Inventors: Tom Francke, Sollentuna (SE); Vladimir Peskov, Stockholm (SE)

(73) Assignee: XCounter AB, Danderyd (SE)

( * ) Notice: Subject to any disclaimer, the term of this patent is extended or adjusted under 35 U.S.C. 154(b) by 428 days.

(21) Appl. No.: 09/752,722

(22) Filed: Jan. 3, 2001

(65) Prior Publication Data

US 2002/0074505 A1 Jun. 20, 2002

(30) Foreign Application Priority Data

Dec. 14, 2000 (SE) ................................ 0004635

(51) Int. Cl.$^7$ .................... G01T 1/185; H01J 47/00
(52) U.S. Cl. ................................ 250/389; 250/336.1
(58) Field of Search .................. 250/389, 374, 250/336.1, 370.1, 363.1, 362; 378/19

(56) References Cited

U.S. PATENT DOCUMENTS

| | | | |
|---|---|---|---|
| 4,864,138 A | | 9/1989 | Mullani |
| 5,311,010 A | * | 5/1994 | Kruger ................ 250/214 VT |
| 5,451,789 A | | 9/1995 | Wong et al. |
| 5,453,623 A | | 9/1995 | Wong et al. |
| 5,665,971 A | | 9/1997 | Chen et al. |
| 5,773,829 A | * | 6/1998 | Iwanczyk et al. ........... 250/367 |
| 6,100,532 A | | 8/2000 | Bryman |
| 6,340,819 B1 | * | 1/2002 | Durst et al. ................ 250/374 |
| 6,410,919 B1 | * | 6/2002 | Nickles ................ 250/363.03 |
| 6,486,468 B1 | * | 11/2002 | Lacy .......................... 250/282 |
| 2001/0040937 A1 | * | 11/2001 | Francke et al. ............... 378/98 |
| 2002/0121603 A1 | * | 9/2002 | Wong et al. ........... 250/363.09 |

FOREIGN PATENT DOCUMENTS

WO    WO0062097    10/2000

OTHER PUBLICATIONS

Chepel, V. et al., "The liquid xenon detector for PET: recent results." Nuclear Science, IEEE, 1038–1044, Nov. 8–14, 1998.
Tavernier, S. et al., "First results from a prototype PET scanner .." Nuclear Science Symposium & Medical Imaging Conference, 1994, pp. 1885–1887, vol. 4.
Chepel, V. et al., "First Tests of a Liquid Xenon Multiwire Drift Chamber for PET." Nuclear Science Symposium & Medical Imaging Conference Record, p. 1155–1159, vol. 3.

* cited by examiner

Primary Examiner—David Porta
Assistant Examiner—Christine Sung
(74) Attorney, Agent, or Firm—Birch, Stewart, Kolasch & Birch, LLP

(57) ABSTRACT

A radiation detector including a chamber capable of being filled with an ionizable and scintillating substance, and a radiation entrance arranged such that radiation can enter said chamber partly for ionizing said ionizable and scintillating substance, partly for being converted into light therein, is disclosed. The detector further includes a light detector for detection of said light, and an electron avalanche detector for avalanche amplification and detection of electrons released as a result of the ionization. Further, there are provided means for correlating detected light and detected electrons, which are derivable from a single radiation photon; and means for producing a signal from the correlated detected light and detected electrons. The detector is particularly suitable for positron emission tomography (PET).

52 Claims, 3 Drawing Sheets

DETECTION OF RADIATION AND POSITRON EMISSION TOMOGRAPHY

TECHNICAL FIELD OF THE INVENTION

The present invention generally relates to detection of ionizing radiation such as e.g. gamma and X-rays, and particularly to positron emission tomography (PET).

More specifically, the invention relates to a novel detector arrangement and a method, respectively, for highly temporally and spatially resolved detection of radiation, and to a positron emission tomography apparatus and a method, respectively, for construction of an image of an object of interest from linear projections of radiation as emitted from the object and subsequently detected at high speed and at accurately determined positions.

DESCRIPTION OF RELATED ART AND BACKGROUND OF THE INVENTION

A PET detector or camera typically consists of a polygonal or circular ring of radiation detection sensors placed around a patient area. Radiation detection begins by injecting isotopes with short half-lives into a patient's body placed within the patient area. The isotopes are absorbed by target areas within the body, and emit positrons. In the human body, the positrons annihilate with electrons. As a result thereof two essentially monoenergetic gamma rays are emitted simultaneously in opposite directions. In most cases the emitted gamma rays leave the body and strike the ring of radiation detectors.

The ring of detectors includes typically an inner ring of scintillation crystals and an outer ring of light detectors, e.g. photomultiplier tubes. The scintillation crystals respond to the incidence of gamma rays by emitting a flash of light (photon energy), so-called scintillation light, which is then converted into electronic signals by a corresponding adjacent photomultiplier tube. A computer, or similar, records the location of each light flash and then plots the source of radiation within the patient's body by comparing flashes and looking for pairs of flashes that arise simultaneously and from the same positron-electron annihilation point. The recorded data is subsequently translated into a PET image. A PET monitor displays the concentration of isotopes in various colors indicating level of activity. The resulting PET image then indicates a view of neoplasms or tumors existing in the patient's body.

Such detector arrangement is known to have a good energy resolution, but relatively bad spatial and temporal resolutions. Early PET detectors required a single photomultiplier tube to be coupled to each single scintillation crystal, while today, PET detectors allow a single photodetector to serve several crystals, see e.g. U.S. Pat. Nos. 4,864,138; 5,451,789; and 5,453,623. In such manner the spatial resolution is improved or the number of photodetectors needed may be reduced.

Nevertheless, relatively low spatial resolutions are still obtained by PET detectors employing scintillator-based photodetectors. Further improved spatial resolution requires the use of a large number of small photodetectors and a scintillator system, which generates light photons only in the scintillator segment in which the incident radiation was absorbed. The use of a larger number of photodetectors in a large array or to increase the resolution of the device results in very complex and expensive apparatus if at all realizable.

Further, in medical applications where it is desired to expose the patient to a minimum amount of ionizing, it is important that the detector device is sensitive to low levels of radiation while still being able to discriminate against background radiation. In some applications scintillator-based detectors may not possess sufficiently high sensitivities or signal-to-noise ratios.

Still further, the light detecting arrangement of the detector device is typically sensitive to direct irradiation by the incident radiation and in such instance measures have to be taken in order to prevent the incident radiation from reaching such arrangement.

SUMMARY OF THE INVENTION

Accordingly, it is an object of the present invention to provide a detector arrangement and method for detection of radiation, which simultaneously provide for very high temporal and spatial resolutions.

A further object of the invention is to provide a positron emission tomography (PET) apparatus and a method, respectively, for construction of an image of an object of interest from linear projections of radiation as emitted from the object and subsequently detected, which provide for a high speed and a very high spatial resolution of the image constructed.

Yet a further object of the invention is to provide such detector arrangement, PET apparatus, and methods, which provide for effective rejection of noise; thus exhibiting high signal-to-noise ratios.

Still a further object of the invention is to provide such detector arrangement, PET apparatus, and methods, which provide for spectrally resolved detection. In the case of PET detection an improved energy resolution can provide for a lower number of erroneously correlated signal pairs.

Yet a further object of the invention is to provide such detector arrangement, PET apparatus, and methods, which can operate at fairly high radiation fluxes and which thus provide for rapid examinations.

Still a further object of the invention is to provide such detector arrangement, PET apparatus, and methods, which are effective, accurate, reliable, easy to use, and of low cost.

These objects among others are, according to the present invention, attained by detector arrangements, PET apparatus, and methods, as claimed in the appended claims.

By providing a dual detector arrangement having a chamber filled with a scintillating and ionizable substance wherein light as well as electrons are created as a result of interactions between incident radiation and the substance, and in which the light and the electrons, respectively, are independently detected in a respective arrangement detector, i.e. in a light detector and in an electron avalanche detector, respectively, followed by correlation of the respective light and electrons which originate from the respective same incident radiation photon, detection may be performed which exhibit major advantages of both light detectors and electron avalanche detectors. Particularly, as light detectors are known to provide high energy resolution and electron avalanche detectors are known to provide high position and temporal resolutions, the inventive dual detector arrangement can provide the high energy resolution of the light detectors and simultaneously provide the high position and temporal resolutions of the electron avalanche detectors. Such detector arrangement is eminently adapted to be employed in positron emission tomography (PET) to reject otherwise erroneously matched signal pairs, by means of which images with reduced levels of noise can be produced.

Further characteristics of the invention and advantages thereof will be evident from the following detailed description of preferred embodiments of the invention, which are shown in the accompanying drawings.

BRIEF DESCRIPTION OF THE DRAWINGS

The present invention will become more fully understood from the detailed description of embodiments of the present invention given hereinbelow and the accompanying FIGS. 1–5, which are given by way of illustration only, and thus are not limitative of the invention.

DETAILED DESCRIPTION OF PREFERRED EMBODIMENTS

In the following description, for purposes of explanation and not limitation, specific details are set forth, such as particular techniques and applications in order to provide a thorough understanding of the present invention. However, it will be apparent to one skilled in the art that the present invention may be practised in other embodiments that depart from these specific details. In other instances, detailed descriptions of well-known methods and apparatuses are omitted so as not to obscure the description of the present invention with unnecessary details.

Figure 1:
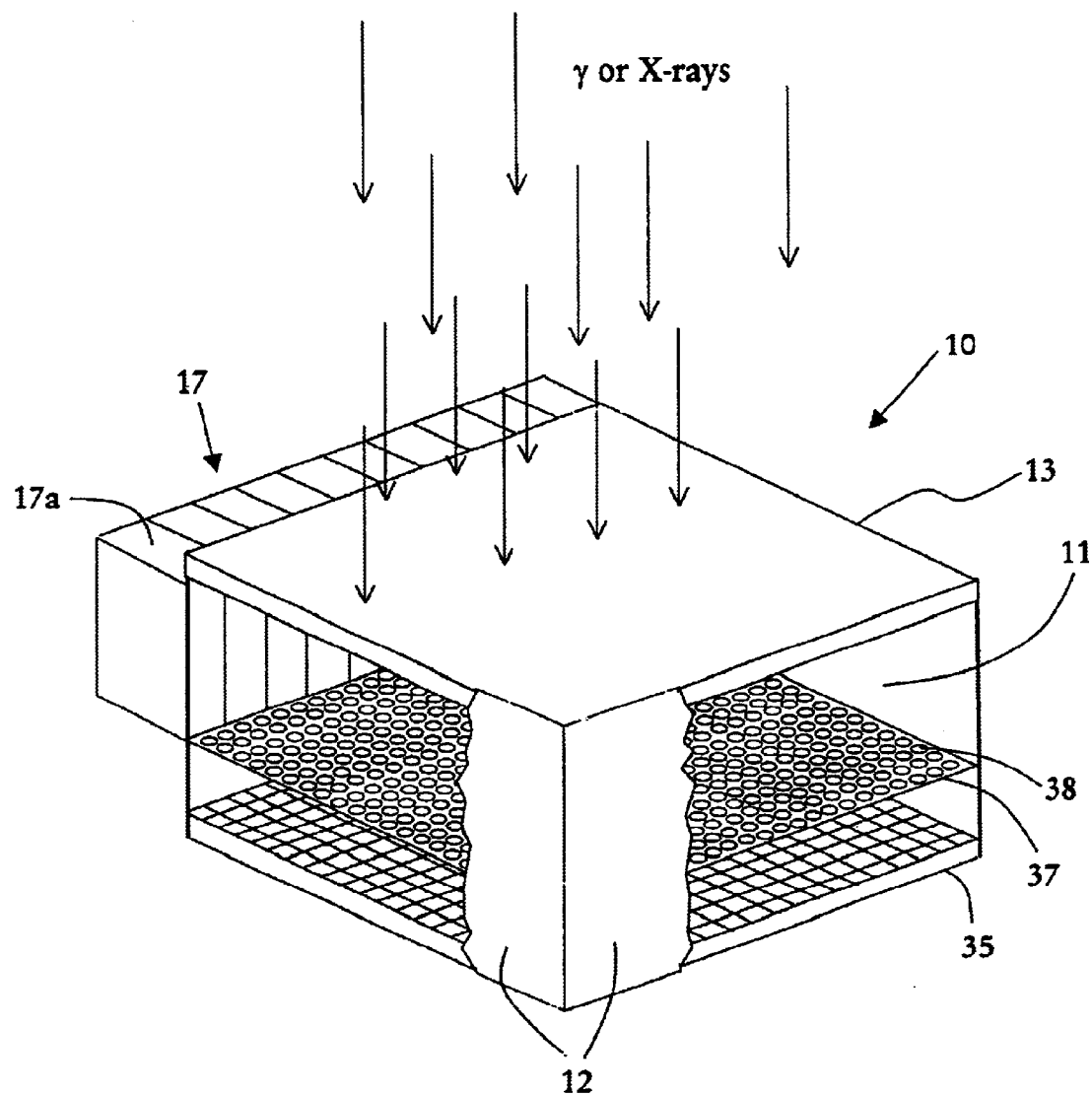
FIG. 1 illustrates schematically, in a perspective view, a radiation detector arrangement according to a first embodiment of the present invention.
Figure 2:
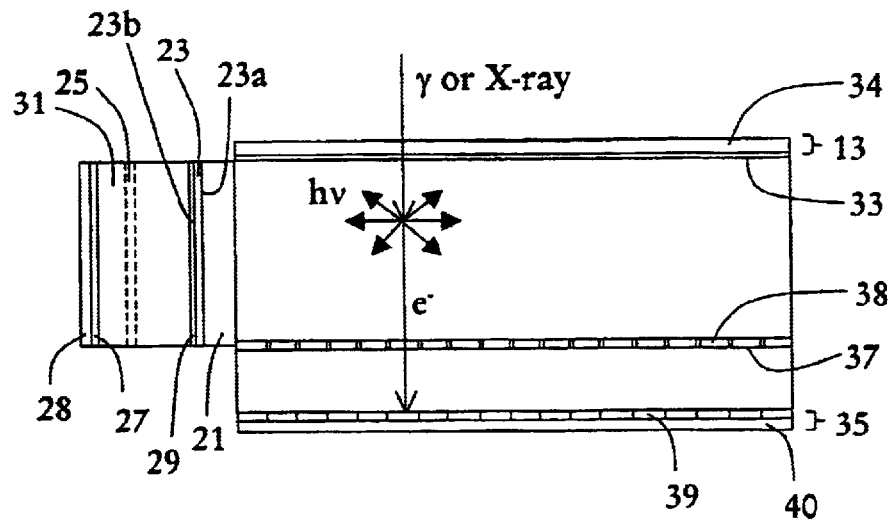
FIG. 2 illustrates schematically, in a cross sectional view, the radiation detector arrangement of FIG. 1.

With reference to FIGS. 1 and 2, which schematically illustrate in a perspective view and a cross sectional view, respectively, a radiation detector arrangement 10, a first embodiment of the present invention will be described.

Detector arrangement 10 includes a substantially planar cathode 13 and anode 35, respectively, and sidewalls 12 (which are partly removed in FIG. 1 for illustrative purposes), which together define a gas tight space or chamber 11 wherein an ionizable and scintillating substance can be arranged. Cathode 13 also constitutes a radiation entrance window for incident radiation, which typically may be gamma or X-rays, and is typically oriented such that the incident radiation is entering arrangement 10 substantially perpendicular to the plane of cathode 13.

The ionizable and scintillating fluid, which preferably also shall be a suitable medium for electron avalanche multiplication, can be in gaseous, liquid, or solid phase and comprises typically any of Ar, Xe, Kr, or a mixture therefore, optionally with small amounts of e.g. $CO_2$, $CH_4$, $C_2H_6$ or isobutene added thereto, to improve the avalanche amplification achievable. If a gas or gas mixture is employed, it may be under pressure, preferably in a range of 1–20 atm. If a solid is employed it is preferably a solidified noble gas.

Cathode 13 includes a conductive cathode layer 33 optionally carried by a dielectric substrate 34, and anode 35 includes a plurality of rectangular, quadratic or otherwise shaped conductive pads 39 arranged on a dielectric substrate 40. The anode 35 also constitutes a readout arrangement of the detector arrangement 10 and thus conductive pads 39 constitute readout elements for spatially resolved detection of electrons (created as a result of ionization of the substance by the incident radiation) drifted and accelerated towards the anode 35. The conductive elements 39 are thus electrically insulated from each other by means of the dielectric substrate 40.

Alternatively, a separate readout arrangement is provided which may be arranged in vicinity of anode 35, in vicinity of cathode 13, or elsewhere. Typically, such readout arrangement is separated from any adjacent electrode by means of a dielectric, or similar. Some readout arrangement geometries to be used in the present invention are further described in our copending Swedish patent application No. 9901325-2 entitled Radiation detector, an apparatus for use in planar radiography and a method for detecting ionizing radiation and filed on Apr. 14, 1999, which application hereby is incorporated by reference.

Further, the readout arrangement is connected to a signal processing device (not illustrated) for necessary and/or desired post-processing of collected signal data. Preferably, the readout elements 39 are separately connected to the signal processing circuit by means of individual signal conduits. A signal display unit (neither illustrated) is provided for displaying the processed signal data.

Between and substantially in parallel with cathode 13 and anode 35 there is arranged an avalanche cathode 37, which typically is a conductive sheet or similar provided with a plurality of holes 38, through which electrons may pass. Preferably holes 38 of cathode 37 and readout elements 39 of anode 35 are aligned with respect to each other such that each hole is overlying a respective readout element.

Cathodes 13, 37 and anode 35 are held, during use, at selected electric potentials by means of an electrical power supply device (not illustrated). Preferably, anode 35 is grounded and cathodes 13, 37 are held at respective selected electrical potentials such that a weak electrical field, called drift field, is obtained substantially between cathode 13 and cathode 37 and a strong electrical field, called avalanche multiplication field, is obtained between cathode 37 and anode 35, and possibly around cathode 37.

Other avalanche amplification arrangements that can be used as an alternative to avalanche cathode 37 are further described in our above mentioned Swedish patent application No. 9901325-2.

It shall particularly be noted that an ionizable and scintillating solid material can be arranged between cathode 13 and cathode 37; and that another solid material, or fluid (gas or liquid), which is suitable for electron avalanche amplification, can be arranged between cathode 37 and anode 35.

The size of the detector arrangement and consequently of the readout arrangement 35 may vary tremendously. In a large area detector, such as would be used for medical imaging purposes, a readout arrangement may typically have many thousands of readout elements and have outer dimensions of up to 2 m×2 m. At the contrary thereto, a small area detector used for other applications may be smaller than 1 mm×1 mm.

Further detector arrangement 10 includes a light detector 17 for detection of scintillating light emitted in space 11 as a result of interactions between incident radiation and the substance. Light detector 17 is preferably arranged so as to detect light emitted mainly perpendicular to the incident radiation entered into chamber 11 and includes typically an array of light detecting elements 17a, such as e.g. photo-multiplier tubes, photodiodes, CCD elements or similar for independent detection of light emitted in chamber 11.

Each of the light detecting elements may be provided with a respective light collimator 21 such that each element "sees" a different portion of chamber 11. An alternative to the provision of individual collimators for the light detecting elements is to divide chamber 11 into a plurality of chamber sections separated by light reflecting or absorbing walls (not illustrated), each of the walls being substantially parallel with the incident gamma or X-ray radiation such that each light detecting element is capable of detecting light emitted within a single one of the chamber sections.

In such manners each light detection element is capable of detecting light derivable from absorption by a respective transversely separated portion of the incident gamma or X-ray radiation and thus one-dimensional imaging of the incident radiation is provided.

An alternative light detector may comprise, as illustrated in FIG. 2, the collimator 21, a photocathode 23, a protective layer 29, a space or chamber 31 to be filled with an avalanche amplification medium, an avalanche amplifier or field concentration device 25 housed within space 31, and a readout arrangement 27, 28, the readout arrangement including an array of readout elements 27 provided on a dielectric substrate 28 and electrically connected to the signal processing device by means of individual conduits (not illustrated). Such a detector for detection of scintillating light is disclosed in our copending Swedish patent application No. 0002079-2 entitled Radiation detection apparatus and method, filed on Jun. 5, 2000 and hereby incorporated by reference, and operates in the following manner.

Photocathode 23 is adapted to release photoelectrons in dependence on the light emitted in chamber 11 and subsequently impinged onto photocathode 23. The photoelectrons are preferably released from a surface 23b (back surface) of photocathode 23 as a result of the light impinging on an opposite surface 23a (front surface) of photocathode 23. Further, the photoelectrons are drifted and accelerated towards avalanche amplifier 25 and readout elements 27 by means of appropriately applied voltages between photocathode 23 and avalanche amplifier 25 and between avalanche amplifier 25 and readout elements 27, respectively. Within and adjacent the avalanche amplifier, which may comprise e.g. an electrode provided with apertures (similar to the avalanche cathode 37 in chamber 11), the electrical field is focused and as a result thereof the electrons are accelerated and multiplied to release electron avalanches (due to repeated collisions between electrons and the avalanche amplification medium). As these electron avalanches reach readout arrangement 27, 28 they are detected in one or several of the readout elements 27.

Typically, the size of the individual light detecting elements (PMT's, photodiodes, readout elements etc.) of the light detector 17 is larger or much larger than the size of the readout elements 39 of the avalanche electron detector 13, 37, 35, such that the position resolution of light detector 17 is worse or much worse than that of avalanche electron detector 13, 37, 35.

On the other hand light detectors are known to possess better energy resolution than avalanche electron detectors do, and light detector 17 in the present invention is designed and optimized to possess as good energy resolution as possible. Thus, the energy resolution of light detector 17 is better or much better than that of the electron avalanche detector 13, 37, 35.

In operation, the detector arrangement 10 of FIGS. 1 and 2 is positioned in the path of the radiation, γ or X-ray radiation, desired to be detected. The radiation passes through cathode 13 and is absorbed in the substance housed within chamber 11. As a result thereof scintillating light hν is emitted and free electrons e⁻ are released (see FIG. 2). The scintillating light is detected by means of light detector 17 (e.g. as depicted above), whereas the freed electrons are detected in the following manner.

The applied electrical potentials are causing the freed electrons (released from ionization through primary and secondary reactions) to drift parallel with the electrical field lines towards the avalanche cathode 37 and the anode 35. Correspondingly produced positive charge carriers are drifted with the electrical field lines towards the cathode 13.

At avalanche cathode 37 the electrons begin to be accelerated due to the stronger electrical field experienced and they interact with the substance, causing further electron-ion pairs to be produced. Those produced electrons will also be accelerated in the field, and will interact repetitively with new material, causing yet further electron-ion pairs to be produced. This process continues during the travel of the electrons in the avalanche region towards anode 35 located at the bottom of the avalanche region, and in such manner electron avalanches are formed.

These electron avalanches yield a very large and almost noise-free amplification of the primary released electrons and induce pulses in the readout elements 39, which amplified pulses are individually detected as each readout element has its individual signal conduit to the signal processing device. The signal processing device processes then the pulses; it possibly shapes the pulses, and integrates or counts the pulses from each readout element. Correspondingly, the positive charge carriers induce pulses that may be detected at the cathode 13, or elsewhere.

Thus, by providing a two-dimensional array of readout elements 39 a detector arrangement 10 is obtained, wherein electrons derivable mainly from ionization by transversely separated portions of the incident radiation beam are separately detectable. Hereby, the detector provides for two-dimensional imaging.

The signal processing device, which may be a computer provided with suitable software, includes a correlating means for correlating light detected by light detector 17 and avalanche amplified electrons detected by electron avalanche detector 13, 37, 35, which are derivable from a single radiation photon. Hereby, the signals originating from the same incident radiation photon in the two detector sections are identified and such identification is performed for all signals if possible. Since it is assumed that the light detector has fairly good energy resolution and fairly bad spatial and temporal resolutions, and the opposite holds for the avalanche electron detector section, it is clear that the incident radiation flux limits the extent to which all signals may be correlated or not. It is thus appreciated that two incident radiation photons detected in the avalanche electron detector section spatially and temporally resolved have to be detected in the light detector section either temporally or spatially resolved in order to determine which signals in the respective detector sections that are due to the same incident photon.

Further, the signal processing device comprises a producing means for producing a single signal from two correlated signals, i.e. correlated detected light (signal in the light detector) and detected avalanche amplified electrons (signal in the avalanche electron detector), where the produced signal is more effectively detected against a noise background.

In such manner a detected signal is obtained which may be superior to any of the individual signals obtainable using any one of the detector sections. The inventive detector arrangement may be useful in a large variety of fields such as e.g. the medical field encompassing the techniques computerized tomography (CT), radiology, positron emission tomography (PET). The invention may also be suitable to be used in non-destructive testing; microscopy; and basic and applied research encompassing e.g. detection of neutrons.

Further, the recorded signals carry spectral information of the detected incident radiation photons and thus the detector arrangement provides for energy resolved detection of radiation. A similar detector apparatus based on a dual detector arrangement for energy resolved radiation detection is disclosed in our copending Swedish patent application No. 0003356-3 entitled Adaptable energy-resolved detection ionizing radiation and filed on Sep. 20, 2000, which application is hereby incorporated by reference.

As the light detector arrangement is known to provide a higher energy resolution, the detector arrangement of the present invention can be used to provide excellent spatial, temporal as well as spectral resolution.

It shall be appreciated that while the embodiment described above comprises a detector wherein the incident radiation is intended to be entered into the detector through the cathode thereof, there is no limitation whatsoever in this respect. Particularly, the concept of the present invention is applicable on a planar radiation detector, wherein the incident radiation, which typically is a planar radiation beam, enters the detector sideways between and substantially in parallel with the cathode and anode, and wherein electrons released as a result of ionization by said radiation is drifted and accelerated in a direction which is substantially perpendicular to the direction of the incident radiation. For a further detailed description of such detector geometry, see our above mentioned Swedish patent applications No. 9901325-2 and No. 0003356-3. The light detection arrangement, which typically includes a linear array of individual light detecting elements may be oriented and arranged to detect light emitted in a direction opposite or substantially opposite to the direction of the drifted and accelerated electrons, or to detect light emitted in a direction parallel with the incident radiation. As regards other details and features the arrangement may be configured and arranged as in the FIGS. 1–2 embodiment.

Figure 3:
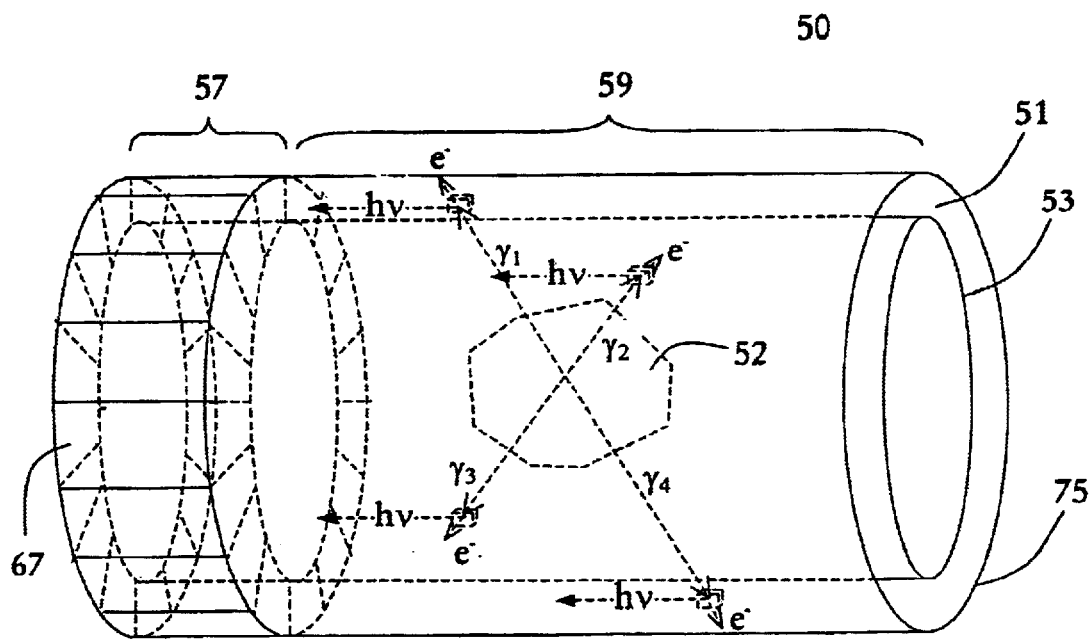
FIG. 3 illustrates schematically, in a perspective view, an apparatus for positron emission tomography (PET) according to a further illustrated embodiment of the present invention.
Figure 4:
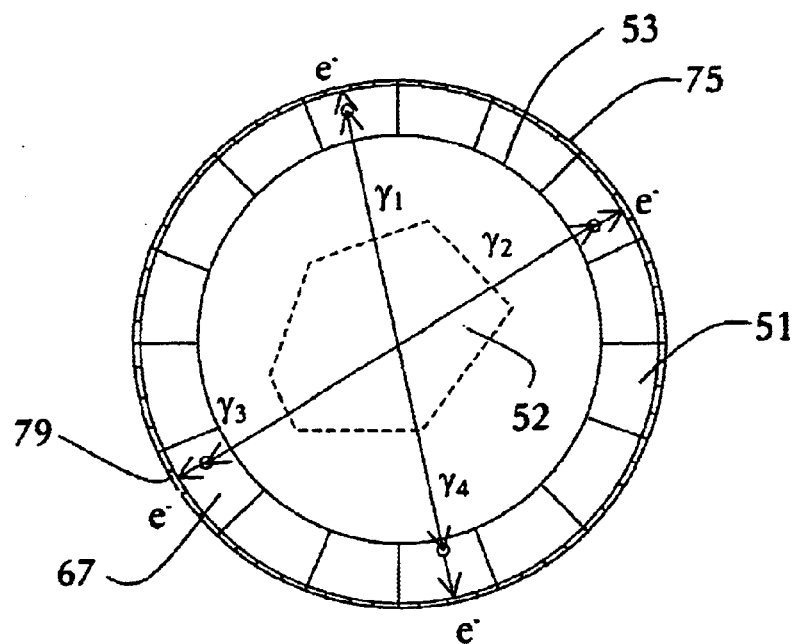
FIG. 4 illustrates schematically, in a cross sectional view, the PET apparatus of FIG. 3.

With reference now to FIGS. 3 and 4, which illustrate schematically, in a perspective view and in a cross sectional view, respectively, an apparatus 50 for positron emission tomography (PET), a particular applied embodiment of the present invention will be briefly described.

PET apparatus 50 comprises a cylindrically shaped electron avalanche detector section 59 and a light detector section 57 arranged at an axial end of detector section 59. Within the electron avalanche detector section 59 a patient area is arranged where a patient, or a portion thereof, 52 may be placed. Electron avalanche detector section 59 comprises an inner cylindrical cathode 53 transparent to gamma radiation and an outer cylindrical anode 75, between which a suitable electrical field is applied during operation by means of an electrical power supply device (not illustrated).

Further, detector section 59 includes enclosure at the axial ends thereof (not explicitly illustrated, but light detector section 57 may provide enclosure at one of the ends) to define a fluid tight annular space 51, wherein an ionizable and scintillating fluid (or solid substance) can be arranged. The ionizable and scintillating fluid, which preferably also is a suitable medium for electron avalanche multiplication, may be any of the substances or mixtures thereof as described in the previous embodiment.

Anode 75 includes a plurality of separate electrically conductive readout elements 79 arranged in a cylindrically shaped matrix, which readout elements 79 are preferably rectangular, quadratic or have other shape and are electrically insulated from each other. Such matrix of readout elements 79 is, as will be further described below, capable of providing spatially resolved detection of electrons created as a result of ionization of the fluid by gamma radiation entered through cathode 53. Readout elements 79 as well as cathode 53 may be arranged on respective dielectric substrates (not illustrated).

Further, light detector section 57 comprises a plurality of individual light collecting elements 67 arranged in a circular fashion to detect any scintillating light emitted in a substantially axial direction. In the illustrated case sixteen light detecting elements 67 are arranged to cover the complete 360° revolution of an axial end of annular space 51. The light detecting elements are preferably PMT's, photodiodes, CCD elements or other fast responding light detecting elements. Detector elements that provide for measurements of high intensity resolution are particularly preferable.

It shall be noted that the size of readout elements 79 is smaller or much smaller than the size of light detecting elements 67, which is shown in FIG. 4. As readout elements 79 are distributed over a cylindrically shaped surface, there are provided a very high number of these compared with the number of light detecting elements 67.

Radiation detection begins by injecting isotopes with short half-lives into a patient's body 52 placed within the patient area within the cylindrical detector section 59. The isotopes are absorbed by target areas within the body, and emit positrons. The positrons annihilate with electrons very fast. As a result of each such annihilation two 511 keV gamma rays, $\gamma_1$; $\gamma_4$ and $\gamma_2$; $\gamma_3$, are emitted simultaneously in opposite directions, i.e. in directions separated by 180°. The emitted gamma rays leave the body, penetrate through the cylindrically shaped cathode 53, and get absorbed by the ionizable and scintillating fluid within annular space 51. As a result of each gamma ray absorption scintillating light hv is emitted isotropically and free electrons $e^-$ are released.

The light hv emitted substantially in an axial direction towards the light detector 57 (denoted by arrows in FIG. 3) from each absorbed gamma ray $\gamma_1$; $\gamma_4$ and $\gamma_2$; $\gamma_3$ is detected in a respective one of the individual light detecting elements. The amplitude or the integrated value of each light induced signal is a measure of the energy of the corresponding radiation photon. Thus, signals which do not lie within an acceptable spectral window can be rejected. How this will be used in a novel manner is described below.

The released electrons $e^-$ from each absorbed gamma photon are caused to drift towards the cathode 75 and the matrix of readout elements 79 thereof by means of the applied electrical field. Correspondingly produced positive charge carriers are drifted towards the cathode 53.

If the electrical field applied is sufficiently high the electrons are heavily accelerated and interact with the fluid, causing further electron-ion pairs to be produced. Those produced electrons will also be accelerated in the field, and will interact repetitively with new material, causing yet further electron-ion pairs to be produced. This process continues during the travel of the electrons in the avalanche region towards anode 75. It shall be noted that avalanche amplification may be facilitated if a suitable field concentration means is arranged between cathode 53 and anode 75.

Electrons impinging on readout elements 79 induce electrical pulses therein, which are detected. Electrons resulting from absorption of a single gamma photon are detected individually in one or several readout elements 79. By providing a large amount of small and closely located readout elements 79 a good spatial resolution is obtained.

Detection of two gamma photons simultaneously in two differently located readout elements 79 indicates then an annihilation of a positron in the patient along a straight line between these elements.

A computer (not illustrated), or similar, records the location of each of these projections and then plots the source of radiation within the patient. The recorded data is subsequently translated into a PET image. A PET monitor displays the concentration of isotopes e.g. in various colors indicating level of activity.

It shall be appreciated that when using such electron avalanche detector 59 an improved spatial and temporal resolution may be obtained to the cost of a deteriorated energy resolution. The number of readout elements 79 in the inventive detector may be very high (several thousands) without complicating or raising the price of the detector and further they may be made very small, e.g. in the submillimeter region.

However, as a consequence of the limited energy resolution of such detector the energy information cannot easily be used for rejection of background or noise. In order to improve the noise rejection of the inventive high-resolution PET apparatus the light detector 57 may be employed. By means of correlating detected light and detected avalanche amplified electrons, which are derivable from a single radiation photon pair, one signal pair from said correlated detected light and detected avalanche amplified electrons can be produced, where this produced signal pair has spatial and temporal resolutions comparable to the spatial and temporal resolutions of the detected avalanche amplified electrons and an energy resolution better than the spectral resolution of detected avalanche amplified electrons.

Such correlation and signal production are repeated for each detected light and each detected electron avalanche and thus an image with lower levels of noise can be produced since the high energy resolution of the light detector assists in rejecting otherwise erroneously matched signals (i.e. signals that are not of the predetermined energy 511 keV are rejected).

It shall be appreciated that the inventive PET apparatus may be modified in a plurality of ways, not at least as regards size, form and geometry.

Figure 5:
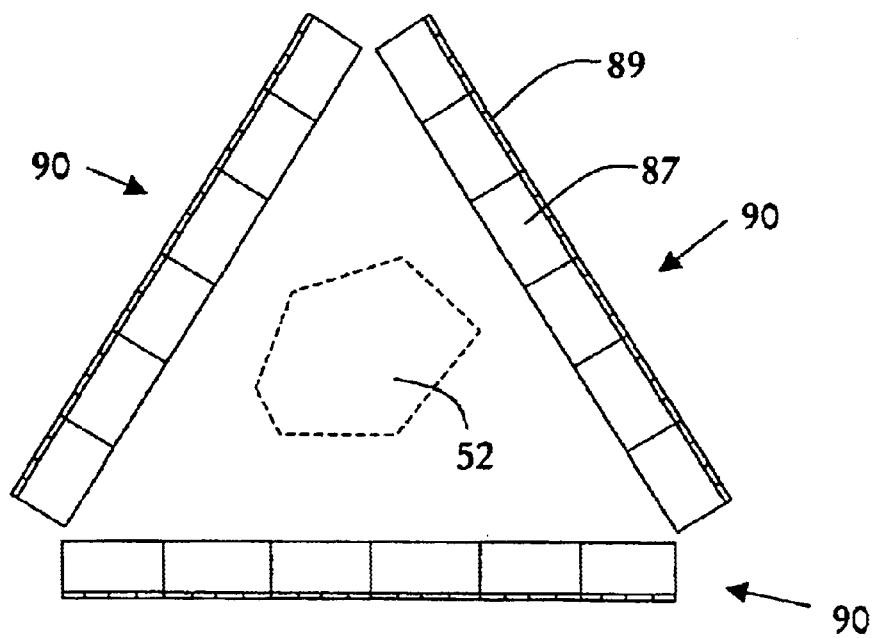
FIG. 5 illustrates schematically, in a cross sectional view, a PET apparatus according to yet a further embodiment of the invention.

Thus, in FIG. 5 is schematically illustrated a cross sectional view of a PET apparatus according to a further embodiment of the invention. Here, a triangular detector geometry is used instead of the circular one illustrated in FIGS. 3 and 4. Thus, three planar dual detector arrangements 90 are arranged at an inclined angle with respect to each other to define the triangular cross sectional shape. Dual detector arrangements 90 are facing the patient area and any patient, or similar, 52 placed therein. Each detector 90 is similar to the one illustrated in FIGS. 1 and 2, and comprises an electron avalanche detector section including a planar matrix of readout elements 89 and a light detector section including an array of light detecting elements 87.

Alternatively, more planar detectors are used to form a PET apparatus, e.g. four to define a square or rectangular cross section apparatus, or even further to define a polygonal cross section apparatus.

It will be obvious that the invention may be varied in a plurality of ways. Such variations are not to be regarded as a departure from the present invention.

What is claimed is:

1. A detector arrangement for detection of radiation comprising:
   a chamber adapted to be filled with an ionizable and scintillating substance;
   a radiation entrance arranged such that radiation can enter said chamber partly for ionizing said ionizable and scintillating substance, partly for being converted into light therein;

a light detection arrangement for temporally, and spatially resolved detection of some of said light;

an electron avalanche detection arrangement for avalanche amplification of electrons released as a result of said ionization of said ionizable and scintillating substance, and for temporally resolved and spatially resolved detection of said avalanche amplified electrons;

a correlator for correlating detected light and detected avalanche amplified electrons, which are derivable from a single radiation photon; and a signal generator for producing a single signal from said correlated detected light and detected avalanche amplified electrons.

2. The detector arrangement as claimed in claim 1 wherein said ionizable and scintillating substance is in liquid phase.

3. The detector arrangement as claimed in claim 1 wherein said ionizable and scintillating substance is in gas phase.

4. The detector arrangement as claimed in claim 3 wherein said gaseous substance has a pressure above atmospheric pressure.

5. The detector arrangement as claimed in claim 1 wherein said ionizable and scintillating substance is in solid phase.

6. The detector arrangement as claimed in claim 1 wherein said substance is a scintillating medium.

7. The detector arrangement as claimed in claim 6 wherein said scintillating medium is any of Ar, Xe, Kr, or a mixture thereof, and said medium for enhanced avalanche multiplication is $CO_2$, $CH_4$, $C_2H_6$, isobutene, or a mixture thereof.

8. The detector arrangement as claimed in claim 1 wherein said light detection arrangement is oriented to detect light emitted mainly perpendicular to said radiation entered into said chamber.

9. The detector arrangement as claimed in claim 8 wherein said chamber is divided into a plurality of radiation absorption volumes separated by light reflecting or absorbing walls, each of said walls being substantially parallel with the radiation entered into said chamber.

10. The detector arrangement as claimed in claim 1 wherein said light detection arrangement includes a plurality of light collimators arranged in an array.

11. The detector arrangement as claimed in claim 1 wherein said light detection arrangement comprises a photomultiplier tube for said temporally and spatially resolved detection of light.

12. The detector arrangement as claimed in claim 1 wherein said light detection arrangement comprises a solid-state based detector for said temporally and spatially resolved detection of said light.

13. The detector arrangement as claimed in claim 12 wherein said solid-state based detector includes a plurality of individual light detection elements arranged in an array such that each light detection element is capable of detecting light derivable from absorption by a respective transversely separated portion of said radiation entered into the chamber.

14. The detector arrangement as claimed in claim 1 wherein said light detection arrangement comprises:

a photocathode adapted to release photoelectrons in dependence on said light;

an electron avalanche amplifier adapted to avalanche amplify said photoelectrons; and a readout arrangement adapted to detect said avalanche amplified electrons.

15. The detector arrangement as claimed in claim 14 wherein said readout arrangement includes a plurality of readout elements arranged in an array such that each readout element is capable of detecting avalanche amplified electrons derivable from absorption by a respective transversely separated portion of said radiation entered into the chamber.

16. The detector arrangement as claimed in claim 1 wherein said electron avalanche detection arrangement comprises:

a cathode and an anode, between which an electrical field can be applied for drift of said electrons released as a result of said ionization;

an electric field concentration means arranged between said cathode and said anode for acceleration and said avalanche amplification of said released electrons; and a readout arrangement for said temporally and spatially resolved detection of said avalanche amplified electrons.

17. The detector arrangement as claimed in claim 16 wherein said readout arrangement comprises a plurality of readout elements arranged in an array such that each readout element is capable of detecting avalanche amplified electrons derivable from by a respective transversely separated portion of radiation entered into the chamber.

18. The detector arrangement as claimed in claim 17 wherein said electric field concentration means includes an electrode provided with a plurality of apertures to allow electrons to pass through said electrode.

19. A positron emission tomography apparatus for construction of a three-dimensional image of an object from linear projections of radiation as emitted from the object comprising the detector arrangement as claimed in claim 1 for detection of the radiation as emitted from said object.

20. The detector of claim 1 wherein said light detection arrangement further performs spectrally resolved detection of at least some of said light, said producing means producing a single signal that has spatial and temporal resolutions comparable to the spatial and temporal resolutions of the detected avalanche amplified electrons, and a spectral resolution comparable to the spectral resolution of the detected light.

21. The detector of claim 20 wherein said electron avalanche detection arrangement performs two-dimensional detection of said avalanche amplified electrons.

22. The detector arrangement as claimed in claim 1 wherein said light detection arrangement is adapted for energy resolved detection of light; and said producing means is adapted to produce said single signal in dependence on the energy of said correlated detected light.

23. The detector arrangement as claimed in claim 22 wherein said single signal has spatial and temporal resolutions comparable to the spatial and temporal resolutions of the detected avalanche amplified electrons, and a spectral resolution comparable to the spectral resolution of the detected light.

24. A method for detection of radiation comprising the steps of:

entering radiation into a chamber filled with an ionizable and scintillating substance partly for ionizing said ionizable and scintillating substance, partly for converting radiation into light therein;

detecting at least some of said light temporally, spatially, and spectrally resolved by means of a light detection arrangement;

avalanche amplifying electrons released as a result of said ionization of said ionizable and scintillating substance, and detecting in two dimensions said avalanche amplified electrons temporally and spatially resolved by means of an electron avalanche detection arrangement;

correlating detected light and detected avalanche amplified electrons, which are derivable from a single radiation photon; and producing a signal from said correlated detected light and detected avalanche amplified electrons, wherein said signal produced from said correlated detected light and detected avalanche amplified electrons has spatial and temporal resolutions comparable to the spatial and temporal resolutions of the detected avalanche amplified electrons, and a spectral resolution comparable to the spectral resolution of the detected light.

25. The method as claimed in claim 24 wherein said at least some of said light is detected substantially perpendicular to said radiation entered into said chamber.

26. The method as claimed in claim 24 wherein light derivable from absorption by a respective one of a plurality of transversely separated portions of said radiation entered into said chamber is separately detected by means of a plurality of individual light detection elements arranged in an array.

27. The method as claimed in claim 24 wherein said temporally and spatially resolved detection of at least some of said light is performed by the steps of:

releasing photoelectrons in dependence on said light by means of a photocathode;

avalanche amplifying said photoelectrons by means of an electron avalanche amplifier; and detecting said avalanche amplified electrons by means of a readout arrangement.

28. The method as claimed in claim 24 wherein avalanche amplified electrons derivable from absorption by a respective one of a plurality of transversely separated portions of said radiation entered into said chamber are separately detected by means of a plurality of individual detection elements arranged in an array.

29. A positron emission tomography method for construction of a three-dimensional image of an object from linear projections of radiation as emitted from the object wherein said radiation as emitted from the object is detected according to the method as claimed in claim 24.

30. The method as claimed in claim 24 wherein said at least some of said light is detected spectrally resolved by means of a light detection arrangement; and said signal produced from said correlated detected light and detected avalanche amplified electrons is produced in dependence on the spectral information of said correlated detected light.

31. The method of claim 30 wherein said step of avalanche amplifying performs two-dimensional detection of said avalanche amplified electrons.

32. The method as claimed in claim 30 wherein said signal produced from said correlated detected light and detected avalanche amplified electrons is produced to have spatial and temporal resolutions comparable to the spatial and temporal resolutions of the detected avalanche amplified electrons, and to have a spectral resolution comparable to the spectral resolution of the detected light.

33. A positron emission tomography (PET) apparatus for construction of an image of an object containing positron emitting substance, said apparatus comprising:

a detector arrangement including a chamber adapted to be filled with an ionizable substance;

a radiation entrance arranged such that gamma radiation photon pairs emitted in dependence on said 5 positrons can enter said chamber for ionizing said ionizable and scintillating substance;

an electron avalanche detection arrangement for avalanche amplification of electrons released as a result of said ionization of said ionizable substance, and for temporally and spatially resolved detection of said electron avalanches;

a processing means coupled to said detector arrangement, said processing means including means for matching a pair of detected electron avalanches, which are derivable from a single radiation photon pair;

means for producing a signal from said matched electron avalanche pair;

said means for matching being arranged to repeat the matching for each further detected electron avalanche, and said means for producing being arranged to repeat the producing of a respective signal for each further matched electron avalanche pair; and reconstruction means for performing a reconstruction process based upon said respective signals as produced by said means for producing, wherein said reconstruction means calculates amounts of emitted positrons from each of an arbitrarily large number of image volumes selected within said object; and a display unit coupled to said processing means for projecting an image of said amounts of emitted radiation.

34. The positron emission tomography apparatus as claimed in claim 30 wherein:

said chamber is adapted to be filled with a scintillating substance;

said radiation entrance is arranged such that gamma radiation photon pairs emitted in dependence on said positrons can enter said chamber for being converted into light therein;

said detector arrangement further includes a light detection arrangement for temporally and spatially resolved detection of at least some of said light;

said means for matching a pair of detected electron avalanches derivable from a single radiation photon pair, is further 15 adapted to match detected light derivable from said single radiation photon pair; to correlate the matched avalanche electron pair and the matched light, which are derivable from the single radiation photon pair; to repeat the matching of detected light for each further detected light; and to repeat the correlating of matched avalanche electrons and matched light derivable from a single radiation photon pair for each further matched electron avalanche pair and each further matched light; and said producing means is adapted to produce a single signal from said correlated detected electron avalanche pair and detected light; and to repeat the producing of a respective signal for each further correlated matched electron avalanche pair and matched light.

35. The positron emission tomography apparatus as claimed in claim 34 wherein said light detection arrangement is adapted for energy resolved detection of light; and said producing means is adapted to produce each respective signal in dependence on the energy of the corresponding respective correlated detected light.

36. The positron emission tomography apparatus as claimed in claim 35 wherein each respective signal has spatial and temporal resolutions comparable to the spatial and temporal resolutions of the respective detected avalanche amplified electrons, and a spectral resolution comparable to the spectral resolution of the respective detected light.

37. The positron emission tomography (PET) apparatus of claim 33 wherein said electron avalanche detection arrangement includes a matrix of readout elements and temporally resolves and two dimensionally detects said electron avalanches.

38. A positron emission tomography (PET) method for construction of an image of an object containing positron emitting substance, comprising the steps of:

entering gamma radiation photon pairs emitted in response to said positrons into a chamber filled with an ionizable substance;

avalanche amplifying electrons released as a result of said ionization of said ionizable substance and detecting said electron avalanches temporally and spatially resolved by means of an electron avalanche detection arrangement;

matching a pair of detected electron avalanches, which are derivable from a single radiation photon pair;

producing a signal from said matched electron avalanche pair;

repeating the step of matching for each further detected electron avalanche;

repeating the step of producing a signal for each further matched electron avalanche pair;

performing a reconstruction process based upon said signals as produced, wherein amounts of emitted positrons from each of an arbitrarily large number of image volumes selected within said object are calculated; and projecting an image of said amounts of emitted radiation.

39. The positron emission tomography method as claimed in claim 38 wherein:

said ionizable substance is also scintillating such that said gamma radiation photon pairs emitted in dependence on said positrons can be converted into light therein;

at least some of said light is detected temporally and spatially resolved by means of a light detection arrangement;

the step of matching includes matching of detected light derivable from a single radiation photon pair, which matching of detected light is repeated for each further detected light;

the matched avalanche electron pair and the matched light derivable from a single radiation photon pair are correlated, which correlation is repeated for each further matched electron avalanche pair and for each further matched light; and the respective signal as produced in the step of producing is produced from the respective correlated detected electron avalanche pair and detected light.

40. The positron emission tomography method as claimed in claim 39 wherein light is detected energy resolved by means of said light detection arrangement; and each respective signal is produced in dependence on the energy of the corresponding respective correlated detected light.

41. The positron emission tomography method as claimed in claim 40 wherein each respective signal has spatial and temporal resolutions comparable to the spatial and temporal resolutions of the respective detected avalanche amplified electrons, and a spectral resolution comparable to the spectral resolution of the respective detected light.

42. The positron emission tomography (PET) method of claim 38 wherein said step of avalanche amplifying electrons uses an electron avalanche detection arrangement including a matrix of readout elements and two dimensionally detects said electron avalanches.

43. A detector arrangement for detection of radiation including a cathode and an anode between which a voltage is applied, said arrangement comprising:

a chamber arranged at least partially between said cathode and said anode, said chamber being filled with an ionizable and scintillating substance;

a radiation entrance arranged such that radiation can enter said chamber between and substantially parallel with said cathode and said anode, partly for being converted into light therein, partly for ionizing said ionizable and scintillating substance, whereby electrons released as a result of said ionization of said ionizable and scintillating substance are drifted substantially perpendicular to the direction of said entered radiation by means of said applied voltage;

a light detection arrangement for temporally and spatially resolved detection of at least some of said light;

an electron avalanche detection arrangement for avalanche amplification of said drifted electrons, and for temporally and spatially resolved detection of said avalanche amplified electrons, said electron avalanche detection arrangement being oriented such that said drifted electrons are accelerated, during avalanche amplification, in a direction substantially perpendicular to the direction of said entered radiation;

correlating means for correlating detected light and detected avalanche amplified electrons, which are derivable from a single radiation photon; and producing means for producing a single signal from said correlated detected light and detected avalanche amplified electrons.

44. The detector arrangement as claimed in claim 43 wherein said light detection arrangement is adapted for energy resolved detection of light; and said producing means is adapted to produce said single signal in dependence on the energy of said correlated detected light.

45. The detector arrangement as claimed in claim 44 wherein said light detection arrangement includes a plurality of individual light detection elements arranged in an array such that each light detection element is capable of detecting light derivable from absorption by a respective transversely separated portion of said radiation entered into the chamber.

46. The detector arrangement as claimed in claim 43 wherein said single signal has spatial and temporal resolutions comparable to the spatial and temporal resolutions of the detected avalanche amplified electrons, and a spectral resolution comparable to the spectral resolution of the detected light.

47. The detector of claim 43 wherein said light detection arrangement further performs energy resolved detection of at least some of said light, said radiation entrance is formed to allow said radiation to be a planar radiation beam;

said electron avalanche detection arrangement includes a plurality of readout elements arranged in an array such that each readout element is capable of detecting avalanche amplified electrons derivable from absorption by a respective transversely separated portion of said radiation entered into the chamber; and said producing means being adapted to produce said single signal depending on the energy of said correlated detected light.

48. A method for detection of radiation comprising the steps of:

entering radiation into a chamber filled with an ionizable and scintillating substance partly for ionizing said ionizable and scintillating substance, partly for converting radiation into light therein;

detecting at least some of said light temporally and spatially resolved by means of a light detection arrangement;

drifting electrons released as a result of said ionization of said ionizable and scintillating substance in a direction substantially perpendicular to the direction of said entered radiation by means of applying an electrical field within said chamber;

avalanche amplifying drifted electrons through acceleration of said drifted electrons in a direction substantially perpendicular to the direction of said entered radiation by means of applying an electrical field within said chamber;

detecting said avalanche simplified electrons temporally and spatially resolved by means of an electron avalanche detection arrangement;

correlating detected light and detected avalanche amplified electrons, which are derivable from a single radiation photon; and producing a signal from said correlated detected light and detected avalanche amplified electrons.

49. The method as claimed in claim 48 wherein the energy of said correlated detected light is measured; and said single signal is produced in dependence on the energy of said correlated detected light.

50. The method as claimed in claim 49 wherein light derivable from absorption by a respective transversely separated portion of said planar radiation beam is detected separately by means of a plurality of individual light detection elements as comprised in said light detection arrangement.

51. The method of claim 50 wherein said entered radiation is a planar radiation beam;

avalanche amplified electrons obtained in said step of avalanche amplifying being derivable from absorption by a respective transversely separated portion of said planar radiation beam detected separately by means of a plurality of readout elements as comprised in said electron avalanche detection arrangement;

the step of detecting further measuring the energy of said correlated detected light; and said step of producing producing said signal depending on the energy of said correlated detected light.

52. The method as claimed in claim 48 wherein said signal produced from said correlated detected light and detected avalanche amplified electrons is produced to have spatial and temporal resolutions comparable to the spatial and temporal resolutions of the detected avalanche amplified electrons, and to have a spectral resolution comparable to the spectral resolution of the detected light.

* * * * *